(12) United States Patent
Kuznetsov

(10) Patent No.: US 12,549,073 B2
(45) Date of Patent: Feb. 10, 2026

(54) TWO-PHASE LIQUID-COOLED ALTERNATING CURRENT (AC) ROTATING ELECTRICAL MACHINE

(71) Applicant: Raytheon Company, Arlington, VA (US)

(72) Inventor: Stephen B. Kuznetsov, Marlboro, MA (US)

(73) Assignee: Raytheon Company, Arlington, VA (US)

( * ) Notice: Subject to any disclaimer, the term of this patent is extended or adjusted under 35 U.S.C. 154(b) by 500 days.

(21) Appl. No.: 17/992,728

(22) Filed: Nov. 22, 2022

(65) Prior Publication Data

US 2024/0171044 A1    May 23, 2024

(51) Int. Cl.
| | |
|---|---|
| H02K 9/20 | (2006.01) |
| H02K 1/20 | (2006.01) |
| H02K 1/32 | (2006.01) |
| H02K 3/24 | (2006.01) |
| H02K 5/20 | (2006.01) |

(52) U.S. Cl.
CPC .......... *H02K 9/20* (2013.01); *H02K 1/20* (2013.01); *H02K 1/32* (2013.01); *H02K 3/24* (2013.01); *H02K 5/203* (2021.01)

(58) Field of Classification Search
CPC .......... H02K 9/20; H02K 5/203; H02K 1/20; H02K 1/32; H02K 3/24
See application file for complete search history.

(56) References Cited

U.S. PATENT DOCUMENTS

| | | | |
|---|---|---|---|
| 2,561,738 | A | 7/1951 | Hill |
| 2,875,263 | A | 2/1959 | Paul |
| 2,961,476 | A | 11/1960 | Maslin et al. |
| 3,201,728 | A | 8/1965 | Mcwhirter |
| 3,261,905 | A | 7/1966 | Allen |
| 3,626,080 | A | 12/1971 | Pierce |
| 3,887,759 | A | 6/1975 | Staub et al. |
| 4,011,535 | A | 3/1977 | Kosky et al. |

(Continued)

FOREIGN PATENT DOCUMENTS

| | | |
|---|---|---|
| CN | 101857794 | 10/2010 |
| CN | 102820738 | 12/2012 |

(Continued)

OTHER PUBLICATIONS

"International Application Serial No. PCT US2023 071860, International Search Report mailed Nov. 10, 2023", 5 pgs.

(Continued)

*Primary Examiner* — Terrance L Kenerly
(74) *Attorney, Agent, or Firm* — Schwegman Lundberg & Woessner, P.A.

(57) ABSTRACT

A two-phased liquid-cooled AC rotating electrical includes a plurality of cooling circuits that recirculate and transition respective engineered liquids between liquid and vapor states around closed-loop fluid paths to cool a plurality of machine components e.g., hollow conductor rotor and stator windings and a magnetic stator core. A portion of each fluid path is either integrated with or in thermal contact with its component. The engineered liquids are evaporated within the respective portions of the fluid paths to hold the operating temperatures at or near the respective and different phase transition temperatures.

16 Claims, 14 Drawing Sheets

(56) References Cited

U.S. PATENT DOCUMENTS

| | | | |
|---|---|---|---|
| 4,071,800 | A | 1/1978 | Atkins |
| 4,078,149 | A | 3/1978 | Whirlow et al. |
| 5,355,942 | A | 10/1994 | Conte |
| 7,005,840 | B2 | 2/2006 | Cester |
| 7,104,313 | B2 | 9/2006 | Pokharna et al. |
| 8,436,706 | B2 | 5/2013 | Sathe et al. |
| 8,928,443 | B2 | 1/2015 | Hyde et al. |
| 9,306,386 | B2 | 4/2016 | Kuznetsov |
| 9,307,914 | B2 | 4/2016 | Fahey |
| 9,531,247 | B2 | 12/2016 | Kuznetsov |
| 9,968,003 | B2 | 5/2018 | Sakamoto et al. |
| 10,123,454 | B2 | 11/2018 | Saito |
| 10,952,354 | B1 | 3/2021 | Chen et al. |
| 11,990,598 | B1 | 5/2024 | Ahmad |
| 12,349,325 | B2 | 7/2025 | Kuznetsov |
| 2005/0098299 | A1 | 5/2005 | Goodson et al. |
| 2005/0205241 | A1 | 9/2005 | Goodson et al. |
| 2008/0122566 | A1 | 5/2008 | Tegart |
| 2011/0047958 | A1* | 3/2011 | Yamashita ............ F01K 25/06 310/90 |
| 2015/0059388 | A1 | 3/2015 | Hirano et al. |
| 2017/0330663 | A1 | 11/2017 | Bauer et al. |
| 2019/0066899 | A1 | 2/2019 | Sakamoto et al. |
| 2021/0180874 | A1 | 6/2021 | Eadelson |
| 2022/0171263 | A1 | 6/2022 | Wu et al. |
| 2022/0418161 | A1 | 12/2022 | Gao |
| 2023/0217630 | A1 | 7/2023 | Gao |
| 2024/0057304 | A1 | 2/2024 | Kuznetsov |

FOREIGN PATENT DOCUMENTS

| | | |
|---|---|---|
| CN | 103280928 | 9/2013 |
| DE | 3031421 | 2/1982 |
| EP | 2774853 | 9/2014 |
| GB | 991656 | 5/1965 |
| JP | 7029754 | 2/2022 |
| WO | 2024036163 | 2/2024 |
| WO | 2024112563 | 5/2024 |

OTHER PUBLICATIONS

"International Application Serial No. PCT US2023 071860, Written Opinion mailed Nov. 10, 2023", 12 pgs.

"International Application Serial No. PCT US2023 080058, International Search Report mailed Mar. 18, 2024", 4 pgs.

"International Application Serial No. PCT US2023 080058, Written Opinion mailed Mar. 18, 2024", 10 pgs.

"U.S. Appl. No. 17/885,400, Restriction Requirement mailed May 28, 2024", 8 pgs.

"3M™ Novec™ 649 Engineered Fluid", Product Information Sheet, (2009), 4 pgs.

"Dielectric Heat Transfer Fluid Solutions for Military and Aerospace Applications", 3M™ Thermal Management Fluids Brochure, (2008), 8 pgs.

"Galden® SV Fluids CFC-free Solvents for Safer Operations", Solvay Specialty Polymers Brochure Version 2.1, (2015), 2 pgs.

Forrest, Eric C., et al., "Pressure Effects On the Pool Boiling of the Fluorinated Ketone C2F5C(O)CF(CF3)2", 2010 12th IEEE Intersociety Conference on Thermal and Thermomechanical Phenomena in Electronic Systems, (2010), 1-9.

Moore, C.L., et al., "Design and Perforkpance Characteristics of Gas/Vapor Transformers", IEEE Transactions on Power Apparatus and Systems, vol. PAS-101, No. 7, (Jul. 1982), 2167-2170.

Moore, C.L., et al., "Recent Developments in Gas/Vapor and Fire Resistant Transformers", 7th IEEE/PES Transmission and Distribution Conference and Exposition, Apr. 1-6, 1979, (1979), 9 pgs.

Narbut, Paul, et al., "Vaporization Cooling for Power Transformers", Transactions of the American Institute of Electrical Engineers. Part III: Power Apparatus and Systems, vol. 78, No. 4, (Dec. 1959), 1319-1325.

Swart, S.M., et al., "Integrated Water Cooled Transformer and Work Coil for Middle Frequency Induction Heating Applications", Conference Record of the 1993 IEEE Industry Applications Conference Twenty-Eighth IAS Annual Meeting, (1993), 1219-1225.

"U.S. Appl. No. 17/885,400, Response filed Jun. 14, 2024 to Restriction Requirement mailed May 28, 2024", 10 pgs.

"U.S. Appl. No. 17/885,400, Non Final Office Action mailed Sep. 10, 2024", 50 pgs.

"U.S. Appl. No. 17/885,400, Response filed Nov. 26, 2024 to Non Final Office Action mailed Sep. 10, 2024", 11 pgs.

"U.S. Appl. No. 17/885,400, Final Office Action mailed Dec. 30, 2024", 42 pgs.

"U.S. Appl. No. 17/885,400, Response filed Feb. 18, 2025 to Final Office Action mailed Dec. 30, 2024", 10 pgs.

"International Application Serial No. PCT US2023 071860, International Preliminary Report on Patentability mailed Feb. 20, 2025", 14 pgs.

"U.S. Appl. No. 17/885,400, Advisory Action mailed Feb. 28, 2025", 2 pgs.

"U.S. Appl. No. 17/885,400, Notice of Allowance mailed Apr. 14, 2025", 9 pgs.

"International Application Serial No. PCT US2023 080058, International Preliminary Report on Patentability mailed Jun. 5, 2025", 12 pgs.

"Japanese Application Serial No. 2025-507316, Notification of Reasons for Refusal mailed Nov. 11, 2025", w English Translation, 9 pgs.

* cited by examiner

Fig. 1H

| DESIGN PARAMETER | VALUE |
|---|---|
| OUTPUT/INPUT POWER RATING | 3200 KVA/3000 kW |
| PRIMARY VOLTAGE OUTPUT/INPUT | 13,800 VOLTS, 3-PHASE, 60 Hz |
| ROTOR OR SECONDARY VOLTAGE | 750 VOLTS DC |
| EXCITER AC VOLTAGE-4TH CIRCUIT | 556 V RMS, 3 PHASE |
| PRIMARY LOSSES/SECONDARY LOSSES | 25 kW/35 kW |
| WINDING CURRENT DENSITIES (PRIMARY/SECONDARY) | 4.5 A/mm2 & 8.1 A/mm2 |
| WINDING CURRENT DENSITY 4TH CIRCUIT | 11 A/mm2 |
| STATOR CORE TEMPERATURE RISE (INLET/OUTLET) | 30° C (19° C/49° C) |
| EXCITER ARMATURE TEMPERATURE RISE (INLET/OUTLET) | 35° C (63° C/98° C) |
| STATOR WINDING TEMPERATURE RISE (INLET/OUTLET) | 15° C (61° C/76° C) |
| ROTOR WINDING TEMPERATURE RISE (INLET/OUTLET) | 25° C (103° C/128° C) |
| STATOR WINDING COOLANT | 3M NOVEC™ TYPE 7200 |
| ROTOR WINDING COOLANT | 3M NOVEC™ TYPE 7500 |
| STATOR CORE COOLANT | 3M NOVEC™ TYPE 649 |
| EXCITER ARMATURE COOLANT | 3M NOVEC™ TYPE 7300 |
| EXTERNAL POWER TO OPERATE 2 MHD PUMPS | 6 kW |
| COMBINED JOULE LOSS + PUMP POWER | 66 kW, OVERALL EFFICIENCY = 97.8% |
| CHILLED WATER INLET TEMPERATURE | 11° C |

| | UNIT | NOVEC™ 7000 | NOVEC™ 7100 | NOVEC™ 7200 | NOVEC™ 7300 | NOVEC™ 7500 | NOVEC™ 7600 | NOVEC™ 649 |
|---|---|---|---|---|---|---|---|---|
| BOILING POINT | °C | 34 | 61 | 76 | 98 | 128 | 131 | 49 |
| VAPOR PRESSURE | kPa | 65 | 27 | 16 | 5.9 | 2.1 | 0.96 | 40 |
| HEAT OF VAPORIZATION | kJ/kg | 142 | 112 | 119 | 102 | 89 | 116 | 88 |
| LIQUID DENSITY | kg/m³ | 1400 | 1510 | 1420 | 1660 | 1614 | 1540 | 1600 |
| SPECIFIC HEAT | J/kg-K | 1300 | 1183 | 1220 | 1140 | 1128 | 1319 | 1103 |
| THERMAL CONDUCTIVITY | W/m-K | 0.075 | 0.069 | 0.068 | 0.063 | 0.065 | 0.071 | 0.059 |
| DIELECTRIC STRENGTH, 0.1" GAP | kV | 40 | 40 | 40 | 40 | 40 | 40 | >40 |

Fig. 11

TWO-PHASE LIQUID-COOLED ALTERNATING CURRENT (AC) ROTATING ELECTRICAL MACHINE

FIELD

This invention relates to advanced cooling systems for AC rotating electrical machines (generator or motors) and more particularly to the application of two-phase liquid-cooling using different engineered fluids such as fluoro-ketones (FKs), hydrofluoroethers (HFEs), perfluorocarbons (PFCs), hydrofluorocarbons (HFCs), perfluorohexans (PFHs), perfluoropolyether (PFPEs) and chlorofluorocarbons (CFCs) to provide a thermal design in which different components of the machine operate at different temperatures and heat loads.

DESCRIPTION OF THE RELATED ART

AC rotating electrical machines are based on Faraday's law, which predicts how a magnetic field will interact with an electric coil to produce an electromotive force (emf) and produce or absorb torque. An AC generator converts mechanical energy (e.g., rotation of a rotor shaft via a prime mover) into electrical energy (e.g., an AC voltage on the stator). An AC motor converts electrical energy (e.g., AC power applied to the stator) into mechanical energy (e.g., rotation of the rotor shaft transferred to a load).

In a vast majority of AC electrical machines a rotor is configured to rotate about a central axis of a stator. The rotor provides a magnetic field. The rotor may be a permanent magnet type or an electromagnet type in which a rotor winding is wound around a ferromagnetic material and excited to produce the magnetic field. The stator includes a stator core that supports one or more stator windings. The stator core is typically a magnetic stator core that provides a stationary electromagnetic EM field although in "superconducting" winding configurations the stator core may be an "air core" such as fabricated from a ceramic or fiberglass. Each rotor and stator winding is usually polyphase (e.g., 3-phase) but may also be single phase. An equivalent configuration positions a stationary EM field (e.g, the stator) along the central axis and rotates the core and windings (e.g., the rotor).

AC electrical machines generate heat. These machines generate heat in the rotor and exciter windings of a wound field machine and in a magnetic stator core and one or more stator windings. Heat can degrade system performance, damage or reduce the lifetime of critical components such as through a dielectric breakdown in the component or even start a fire.

Coolings systems are implemented to remove heat such that an operating temperature is at or below a specified temperature. The capacity of the cooling system is determined by the heat load and the specified operating temperature. Quite often the design of the cooling system is driven by the worst case heat load or operating temperature within a system. Cooling systems require valuable space within a system, energy to remove the heat and add to the overall cost. Newer machines are producing greater amounts of heat in smaller volumes necessitating more efficient cooling systems.

There are a wide range of cooling systems that have been adapted to remove heat depending on space, energy and cost requirements. A heat sink is a passive heat exchanger that transfers heat generated by a device to a fluid medium, often air or a liquid coolant, where it is dissipated away from the device. These may take the form of a "moving air" or a "recirculated immersive system". A related approach might be called a "recirculated integrated system" in which chilled water or hydrogen gas is recirculated directly through components such as hollow conductor rotor or stator windings, hollow conductor exciter windings or around the stator core (via hollow tubing wound around the core or through a void space within a vessel around the core) to absorb and remove heat. In each of these configurations, heat is transferred from a device to a fluid thereby raising its temperature and the fluid is extracted from the component. The components are typically connected in series in a single cooling loop. Chilled water or hydrogen gas first passes through the component (e.g., the stator core) with the lowest operating temp and then through each successive component until finally passing through the component (e.g., the rotor winding) with the highest operating temp before returning to the chilled water reservoir. Precise control of the operating temperature of critical components is difficult.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

The present disclosure provides a two-phase liquid cooled AC rotating electrical machine in which one or more engineered liquids are recirculated through the machine and evaporated to cool components (e.g., rotor or stator windings, magnetic stator core or exciter armature) and hold the component at or near the phase transition temperature of the engineered liquid. Two-phase liquid-vapor cooling can handle far larger heat loads per specific volume than single-phase fluids. Furthermore, the use of series or parallel connections within a fluid path or multiple fluid paths recirculating engineering fluids with different transition temperatures allows for optimization of the cooling system to handle higher power densities and to provide better control of operating temperatures for individual components. The engineered liquids must be chemically inert, thermally stable, non-toxic, exhibit a high dielectric strength and preferably be commercially available. Suitable engineered fluids are selected from fluorinated ketones (FKs), hydrofluoroethers (HFEs), perfluorocarbons (PFCs), hydrofluorocarbons (HFCs), perfluorohexans (PFHs), perfluoropolyether (PFPEs) and chlorofluorocarbons (CFCs) dependent upon the application. FKs and HFEs may be preferable due to environmental concerns such as global warming.

In an embodiment, a two-phase liquid-cooled AC electrical machine includes a wound field electric machine having a rotor in which a hollow conductor rotor winding is wound around a ferromagnetic material and a stator including one or more hollow conductor stator windings supported by a stator core. The rotor is configured to rotate about a central axis of the stator. A pair of independent cooling circuits are configured to absorb the heat load and cool the hollow conductor rotor and stator windings, respectively. Each circuit includes a closed-loop fluid path in which an engineered liquid is recirculated and transitions between liquid and vapor states inside the winding. The engineered liquid is evaporated at a phase transition temperature to cool the winding and hold the operating temperature of the winding at or near the first phase transition temperature. The engineered liquids in the cooling circuits exhibit different transition temperatures to accommodate different heat loads and operating temperatures of the rotor and stator windings.

In another embodiment, the stator includes a plurality of hollow conductor stator windings. In one configuration, each stator winding is provided with a dedicated cooling circuit and engineering fluid selected for its particular heat load and operating temperature. In another configuration in which the stator windings exhibit similar heat loads, the cooling circuit includes a 1:N inlet manifold to distribute the engineered liquid in parallel to each of the stator windings whereby the engineered liquid vaporizes inside the hollow conductor stator windings to hold each of their operating temperatures at or near its transition temperature. In another configuration in which the stator windings exhibit different heat loads, the stator windings are connected in series in a single cooling circuit. The engineered liquid is evaporated in the one or more stator windings with the greatest heat load. The remaining stator windings may be positioned upstream in which case they are cooled by an increase in temperature of the engineered liquid in its liquid phase or downstream in which case they are cooled by an increase in temperature of the engineered liquid in its vapor phase.

In another embodiment, the stator core is a magnetic stator core. In one configuration, a third cooling circuit is configured to recirculate a third engineered liquid around the magnetic stator core (e.g., hollow tubing wound around the stator core or a void space around the stator core) and evaporate to hold the operating temperature of magnetic stator core at or near its transition temperature. In another configuration, one of the cooling circuits is provided with an inlet manifold to distribute the engineered liquid in parallel to each of the stator winding and the magnetic stator core. In another configuration, the stator core is connected in series with the stator winding in a single cooling circuit. The stator core may be cooled by an increase in temperature of the engineered liquid in either its liquid or vaporized state. Alternately, a portion of the engineered liquid may be vaporized within the hollow conductor stator winding and around the stator core to hold both operating temperatures at or near its phase transition temperature.

In an embodiment, each cooling circuit includes in the closed-loop fluid path a pump to recirculate the engineered liquid, a liquid pressure regulator to regulate a pressure of the engineered liquid, a vapor pressure regulator to regulate a pressure of the engineered liquid in its vapor state, and a condenser coupled to a chilled liquid reservoir to condense the engineered vapor into the engineered liquid for recirculation. The cooling circuits are suitably connected in series or parallel to a common chilled liquid (typically water) reservoir. Each cooling circuit may also include a vapor pressure sensor to sense and feedback the vapor pressure to the liquid pressure regulator to control the flow of the engineered liquid.

In an embodiment, the engineered fluid is provided with a conductive solid granular media (e.g., aluminum shot). The pump includes an electro-magnetic pump (e.g., distributed AC induction coils) that generate a traveling magnetic field inside the closed-loop fluid path that interacts with the conductive solid granular media to produce a force to propel both the engineered fluid and media. The media also serves to increase the heat transfer capability of the engineered fluid and to more uniformly cool the portion of the fluid path in which vaporization occurs.

In another embodiment, a two-phase liquid-cooled AC electric machine includes a rotor (permanent magnet or an electromagnet) that provides a magnetic field and a stator including one or more hollow conductor stator windings supported by a magnetic stator core. A pair of independent cooling circuits are configured to absorb the heat load and cool the hollow conductor stator winding and magnetic stator core, respectively.

In another embodiment, a two-phase liquid-cooled AC electric machine includes a rotor (permanent magnet or an electromagnet) that provides a magnetic field and a stator including one or more hollow conductor stator windings supported by a magnetic stator core. A cooling circuits is configured to recirculate an engineered liquid around the magnetic stator core and through the one or more hollow conductor stator windings such that the engineered liquid is evaporated at a phase transition temperature to cool at least one of the hollow conductor stator windings and hold its operating temperatures at or near the phase transition temperature and to cool the remaining hollow conductor stator windings and stator core.

These and other features and advantages of the disclosure will be apparent to those skilled in the art from the following detailed description of preferred embodiments, taken together with the accompanying drawings, in which:

BRIEF DESCRIPTION OF THE DRAWINGS

FIGS. 1A-1I are diagrams illustrating an embodiment of a two-phase liquid-cooled AC rotating electric machine;

DETAILED DESCRIPTION

Figure 1A:
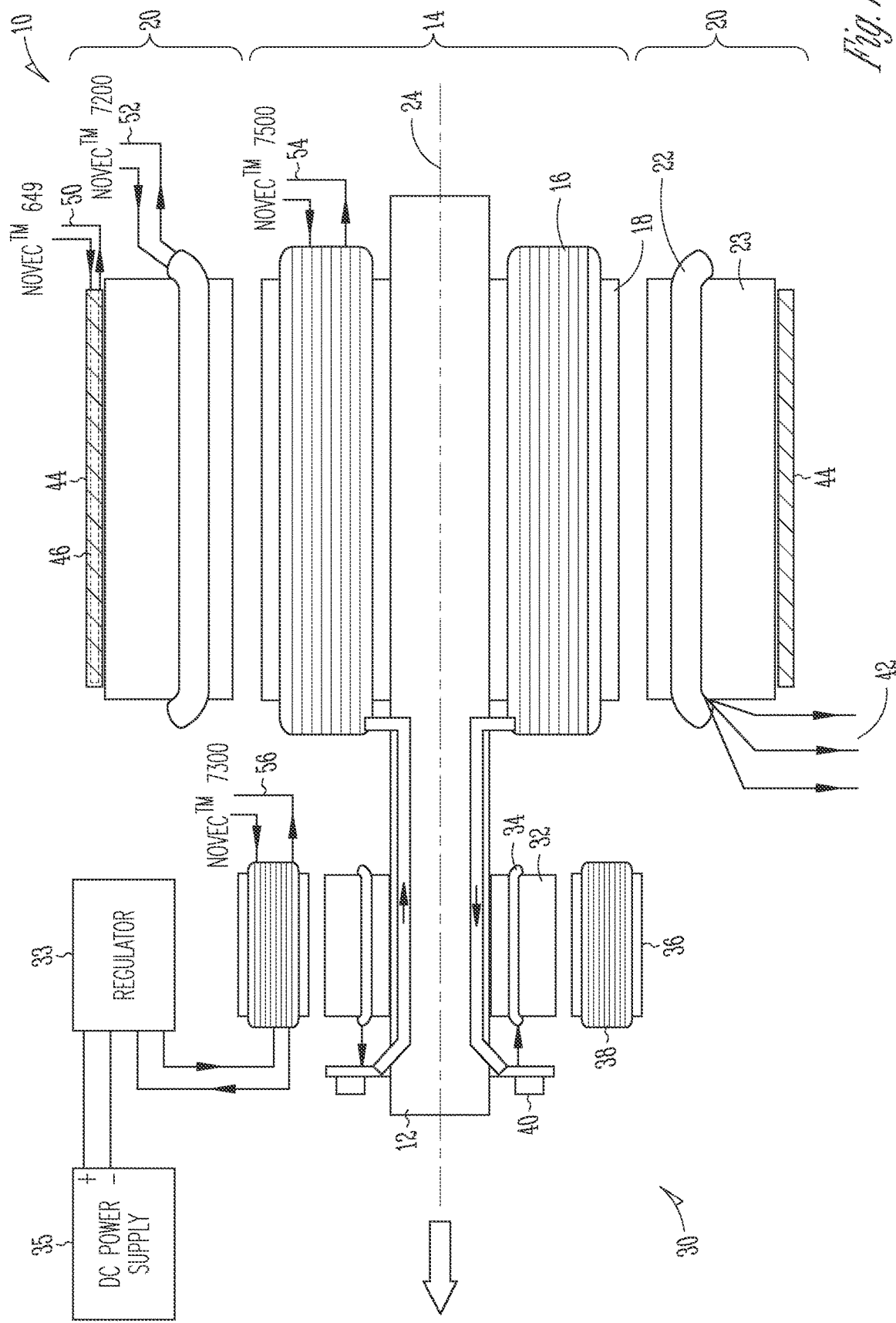

A two-phase liquid cooled AC rotating electrical machine recirculates one or more engineered liquids through the machine and evaporates the liquids to cool components (e.g., rotor or stator windings, stator core or exciter armature) and hold the component at or near the phase transition temperature of the engineered liquid. Two-phase liquid-vapor cooling can handle far larger heat loads than single-phase fluids. Furthermore, the use of series or parallel connections within a fluid path or multiple fluid paths recirculating engineering fluids with different transition temperatures allows for optimization of the cooling system to handle higher power densities and to provide better control of operating temperatures for individual components. The engineered liquids must be chemically inert, thermally stable, non-toxic, exhibit a high dielectric strength and preferably be commercially available. Suitable engineered fluids are selected from fluorinated ketones (FKs), hydrofluoroethers (HFEs), perfluorocarbons (PFCs), hydrofluorocarbons (HFCs), perfluorohexans (PFHs), perfluoropolyether (PFPEs) and chlorofluorocarbons (CFCs) dependent upon the application. 3M™ company manufactures a class of engineered fluids under the tradename Novec™ that are an example of a fluorinated ketone (FK) that exhibits the required properties for a wide variety of applications and is used in the embodiments described herein.

"Vaporization cooling" or "two-phase liquid-cooling" utilizes the phase transition of a fluid from a liquid phase to a vapor phase to accept heat. The primary benefit of this approach is that a liquid-to-vapor phase change at a fixed transition temperature has a far greater heat capacity or heat of vaporization than does heating the liquid. If properly configured, these systems may provide equal or greater cooling capacity than conventional systems while utilizing less space, less energy and at a lower cost.

An important feature of the two-phase liquid-cooling system is that the closed-loop fluid paths allow for the AC rotating electrical machine to be orientation independent. The machine can be turned upside down, on its side or rock back-and-forth without affect cooling performance. This is very important for applications that may be mounted on moving land vehicles, ships or airborne vehicles.

The closed-loop fluid paths also improve the coverage of the hot component surfaces that must be cooled. Forcing the engineered liquid through the hollow conductor rotor or stator coil or around the stator core provides uniform coverage of the entire surface, which results in more uniform cooling of the component.

Without loss of generality, the disclosure will be described for a wound field AC rotating electrical machine in which the rotor includes a rotor winding wound around a magnetic core and the stator includes a magnetic core. The same two-phase liquid-cooling may be applied to a permanent magnet AC rotating electrical machine in which the rotor includes a permanent magnet. The closed-loop fluid paths are used to cool the stator core and one or more stator windings. In certain embodiments where the rotor windings are superconducting the stator core can be non-magnetic and does not require cooling.

FIGS. 1A-1G illustrate an embodiment of a two-phase liquid-cooled wound field AC rotating electrical machine 10, which may be configured as either a motor or an electrical generator. As a motor, a rotor shaft 12 is coupled to a load to produce mechanical energy. As a generator, rotor shaft 12 is coupled to a prime mover to receive mechanical energy and convert it to electrical power.

As shown in a radial-longitudinal view in FIG. 1A, machine 10 includes a main field (rotor) 14 in which a rotor winding 16 is wound around a ferromagnetic material 18 attached to rotor shaft 12 and a stationary main armature (stator) 20 in which one or more stator windings 22 are supported by a magnetic stator core 23. Each stator winding 22 is typically multi-polar and multi-turn electric coils. Rotor shaft 12 is configured to rotate about a central axis 24 of stator 20.

A wound field exciter 30 provides DC excitation to the rotor winding 16. Exciter 30 includes an exciter armature (rotor) 32 that includes multiple wound AC coils 34 on rotor shaft 12 and an exciter field (stator) 36 that includes an exciter field stator winding 38. The exciter field is stationary and energized by a direct current from a regulator 33 powered by an external DC source 35. Normal synchronous operation is achieved by a fixed or slowly varying DC input for excitation power. Pulsed operation can be achieved by ramping the DC input up and down.

The exciter armature (rotor) 32 rotates with the multiple wound AC coils 34 which are connected on rotor shaft 12 to a rotating rectifier assembly 40 which provides a high direct-current supply with adjustable levels to the main field (rotor) 14 of the machine. Induction from the main rotor field induces current in the main armature (stator) 20. The AC electrical output 42 of the main armature is typically poly-phase but may also be single-phase.

To cool the components of machine 10, engineered liquids are recirculated through the magnetic stator core 23, one or more stator windings 22, rotor winding 16 and exciter field stator winding 38. The engineered liquids vaporize changing from a liquid to a vapor state to cool the respective component and hold the operating temperature at or near the phase transition temperature of the engineered liquid. The magnetic stator core 23 is surrounding by a circumferential cooling jacket 44, which has a set of non-electrically energized hollow cooling tubes 46 wound either circumferentially or in a longitudinal layout, shown as closed-loop fluid path No. 1 50. Three elements in this system may have hollow electrically energized conductors in their windings. Closed-loop fluid path No. 2 52 flows through the stator winding 22. Closed-loop fluid path No. 3 54 flows through the rotor winding 16. Closed-loop fluid path No. 4 58 flows through the hollow conductors in the exciter field stator winding 38. Thus, in each of closed-loop fluid paths 2, 3 and 4 there is a fluoro-ketone or similar engineered fluid with high dielectric strength operating inside electrically conductive conductors. Alternately, closed-loop fluid path No. 4 may be in a cooling jacket which is electrically insulated from the coil conductors in the exciter field although arranged with high heat transfer to the jacket. It is advantageous to allow each closed-loop fluid path to have a distinct coolant temperature rise and/or distinct heat of vaporization since all four main electrical circuits have different current densities and different power dissipations according to size and shape of the coils or the configuration of the magnetic stator core.

Figure 1B:
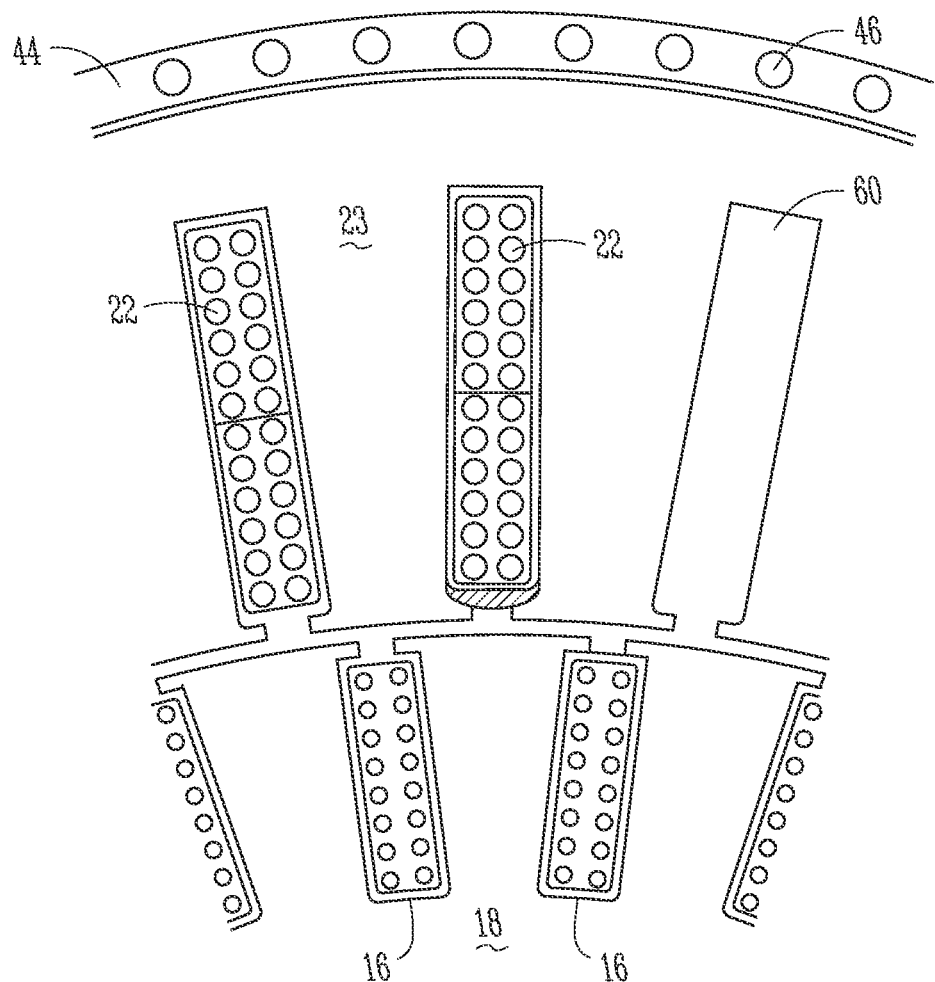

As shown in a cross-section normal to central axis 24 in FIG. 1B, shows a typical cross section of a main stator winding 22 and main rotor winding 16 of a synchronous machine 10 with a circumferential stator core cooling jacket 44. The cooling jacket 44 and its hollow cooling tubes 46 is electrically insulated from the stator magnetic core 23 yet thermally bonded. Slots 60 in each sub-assembly are surrounded by magnetic core 23 or 18 typically formed of laminated high magnetic-permeability electrical steel. The stator winding 22 has for example 18 turns and the rotor winding 16 has for example 14 turns of hollow electrical conductors in each slot, each pumped with the subject engineered fluid. Normally these conductors are series wound in each slot yet parallel windings are also practical. The conductors may be circular, square, rectangular or hexagon shaped in cross section and usually manufactured of a copper alloy.

Figure 1C:
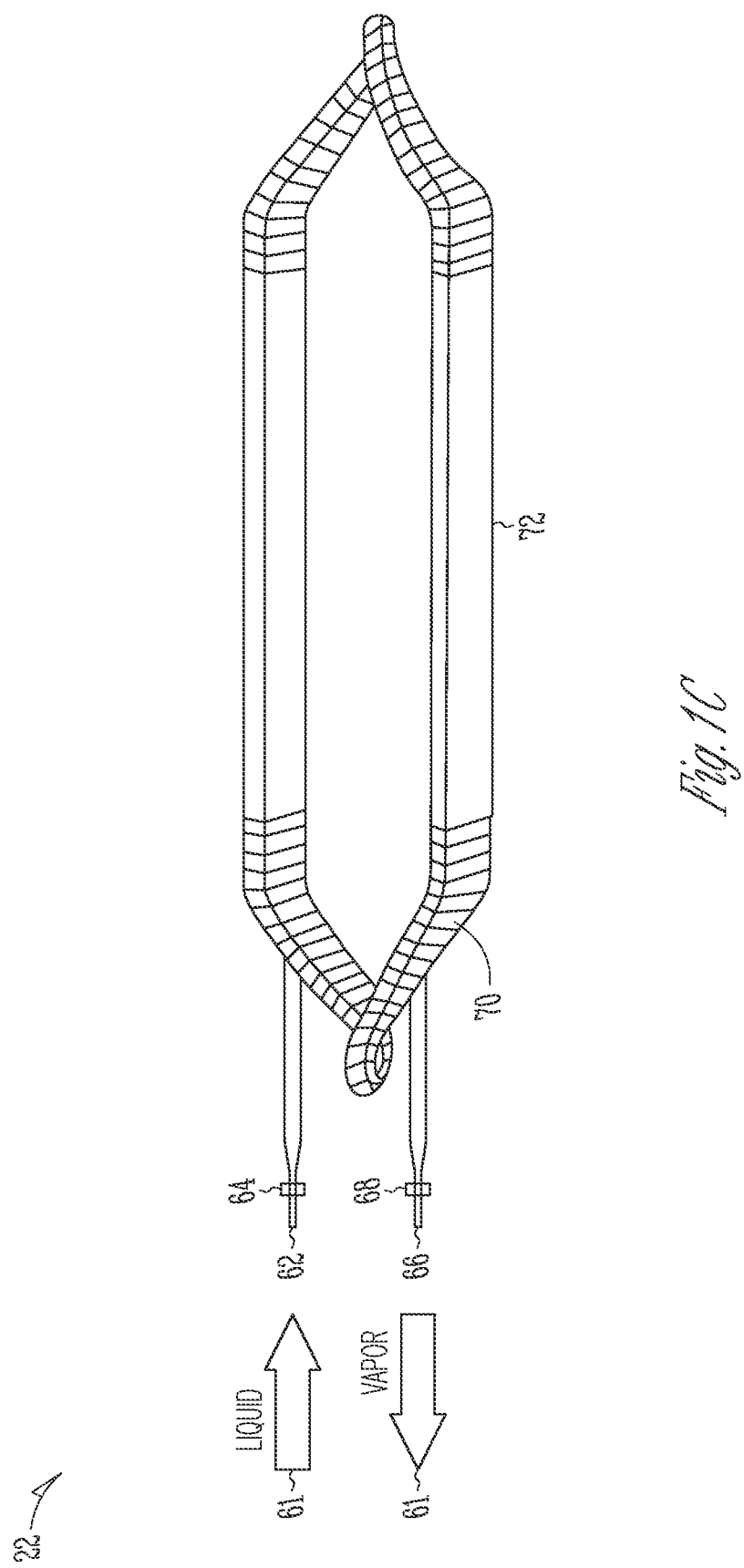

As shown in FIG. 1C, a 3D isometric view of stator winding 22 illustrates an electrically-energized hollow conductor construction of the stator winding 22. An engineered liquid 61 is injected in its liquid state at a fluid inlet 62 and an electrical connection 64 is made to the hollow conductor near inlet 62. Similarly, the engineered liquid is removed in its vapor state at fluid outlet 66 and an electrical connection 68 is made to the hollow conductor near outlet 66. The hollow conductor stator winding 22 is suitably wound with an insulating tape. The hollow conductor stator winding 22 is also suitably wound with a semi-conductive tape 70 and a conductive tape 72 over the insulating tape to distribute the electric field over the high-voltage stator winding.

As shown in FIGS. 1D, 1E, 1F and 1G, an embodiment of a two-phase liquid cooling system 100 includes cooling circuits 102, 104, 106 and 108 connected in a recirculating chilled liquid (typically water) path 110 to independently cool and hold the operating temperatures of stator core 23, one or more stator windings 22, rotor winding 16, and exciter field stator winding 38 at or near respective specified levels. Each cooling circuit recirculates an engineered liquid selected such that its phase transition temperature is at or near the desired operating temperature for the respective machine component.

In this embodiment, each cooling circuit includes a condenser 112 that is coupled to the recirculating chilled liquid path 110 to transition an engineered liquid 114 from its vapor state to its liquid state, a liquid pump 116, a liquid pressure regulator 118, hollow tubing 119 that either is the machine component (e.g., rotor or stator winding) or is in direct thermal contact with the machine component (e.g., the jacket around the stator core) in which the engineered liquid 114 vaporizes at its transition temperature, a vapor pressure sensor 120 suitably configured to measure the vapor pressure and provide a control signal to liquid pressure regulator 118 to control the flow and a vapor pressure regulator 122 to maintain the appropriate vapor pressure for a specific vapor transition temperature and a return path to condenser 112 to form the closed-loop fluid path. Engineered liquid 114 enters the hollow tubing as a liquid at a relatively low inlet temperature where it absorbs heat increasing in temperature until it vaporizes at the transition temperature. The temperature of the vapor may increase or decrease through the vapor pressure regulator as it returns to condenser 112.

Recirculating liquid path 110 includes a chilled liquid reservoir 130, a pump 132, condensers 112 in each of the cooling circuits and a heat exchanger 134 that removes the heat injected by each of the cooling circuits to return the liquid to chilled liquid reservoir 130. It is understood that temperature $T1<T2<T3<T4<T5$. Chilled water out of the reservoir may be $T1=10$ C. Each cooling circuit may increase the water temperature by 5-10 C for example through condenser 112. Alternately, the fluid paths could be connected in parallel to a common chilled liquid reservoir or each connected to a dedicated chilled liquid reservoir.

Figure 1D:
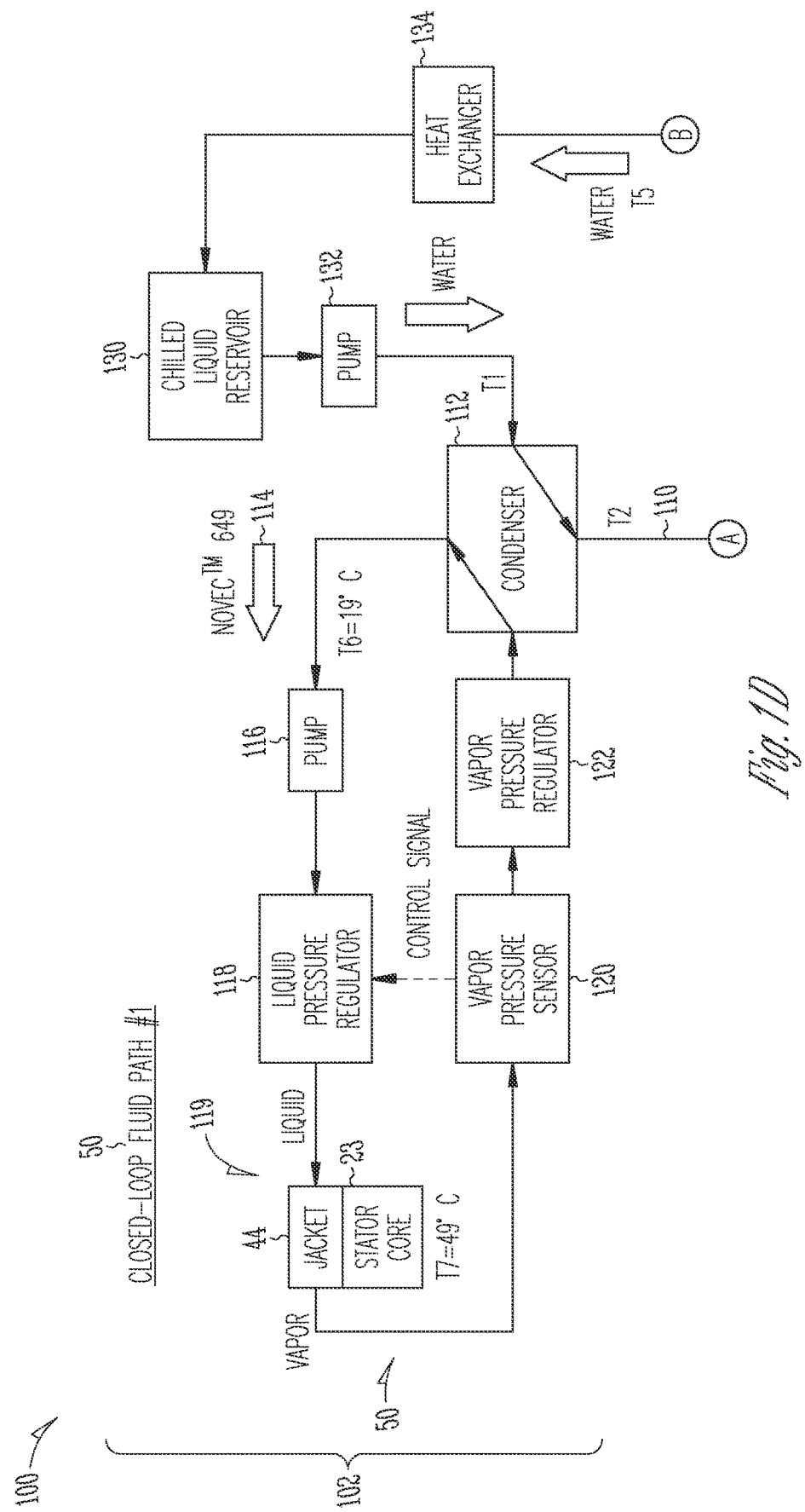
Figure 1E:
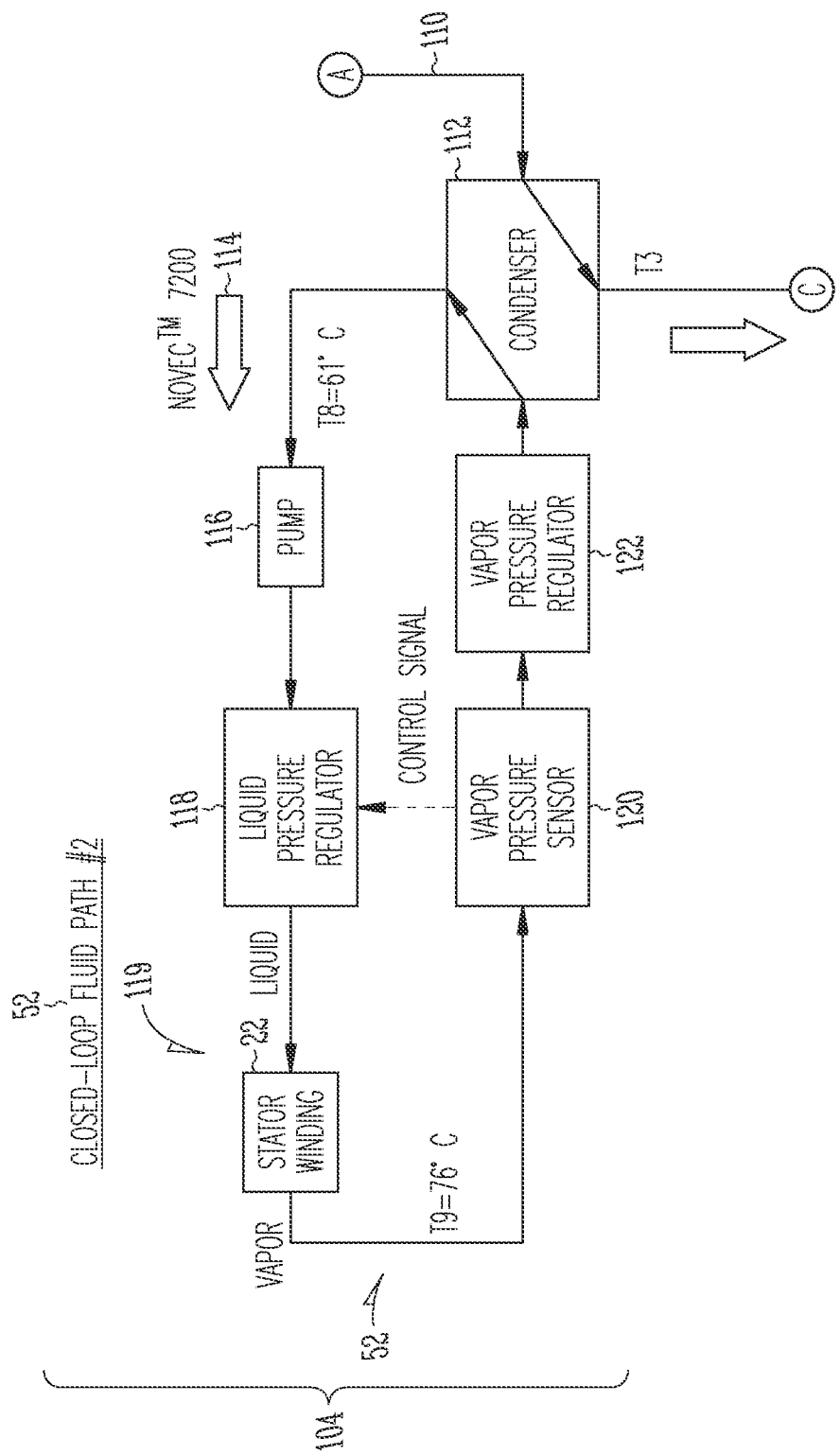
Figure 1F:
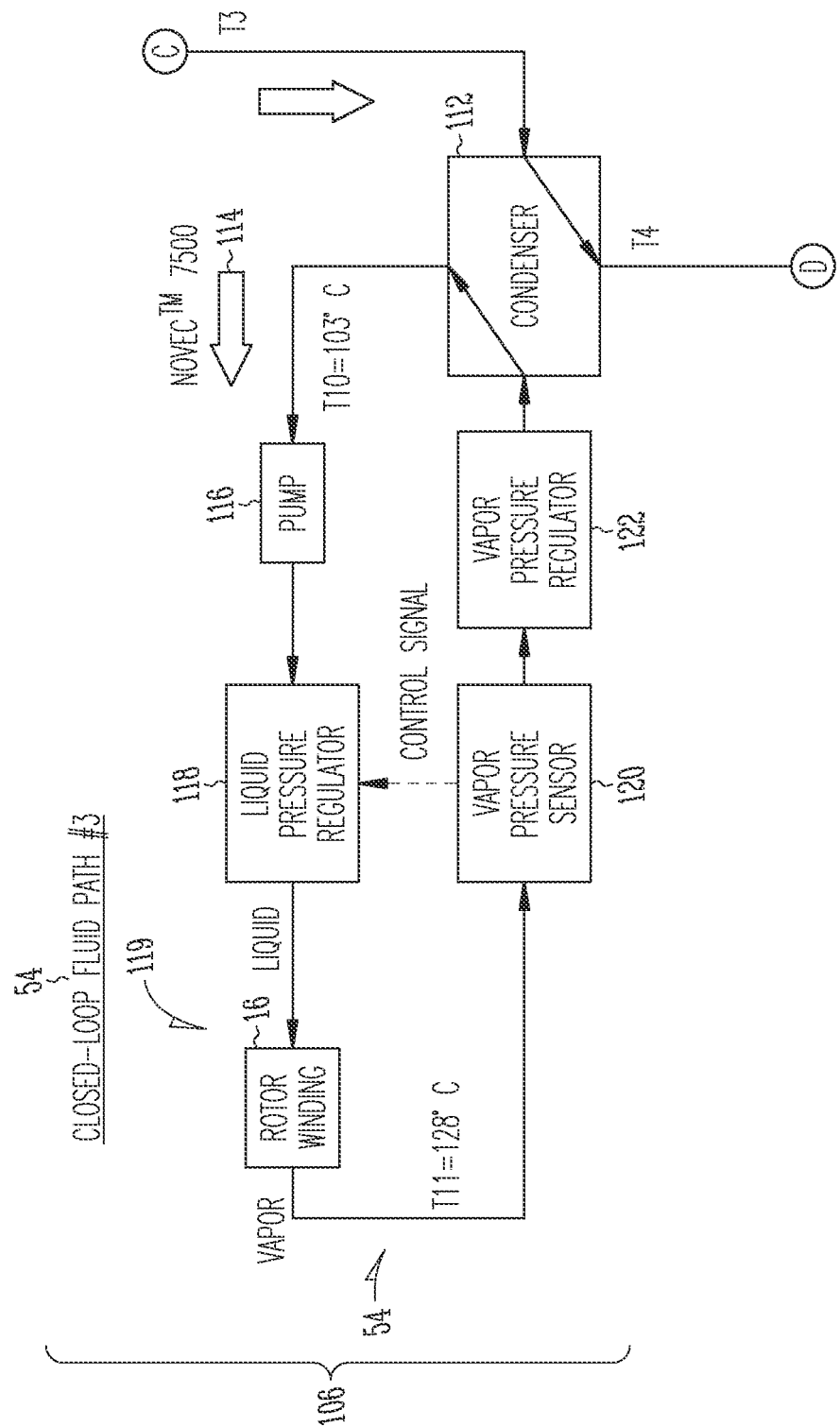
Figure 1G:
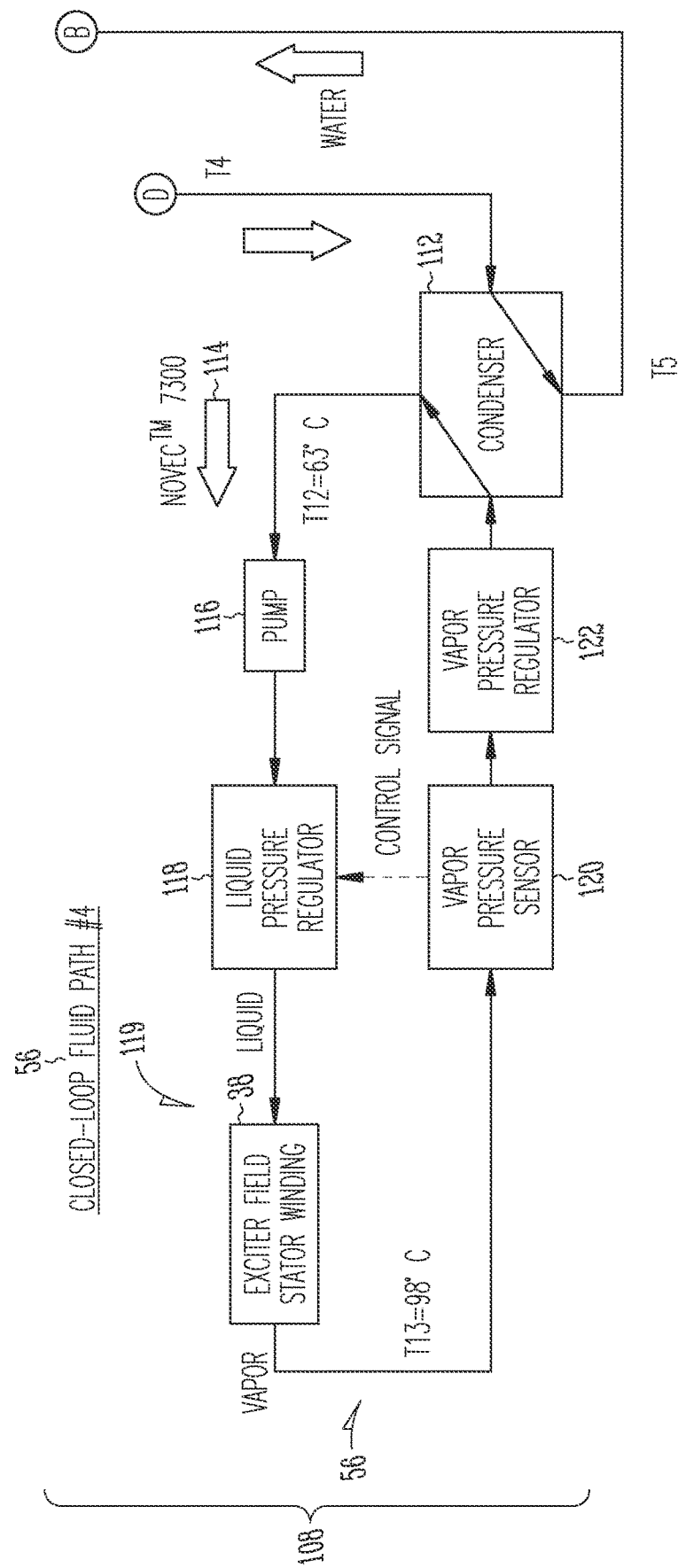

In a particular embodiment, as shown in FIGS. 1D-1E as well as in Table 140 of design parameters for a particular wound field AC rotating machine in FIG. 1H and Table 142 of design parameters for 3M™ Novec™ engineered liquids in FIG. 1I different engineered liquids 114 are recirculated through each of cooling circuits to hold the operating temperatures of the stator core 23, stator winding 23, rotor winding 16 and exciter field stator winding 38 at independently specified values.

In cooling circuit 102, a suitable engineered liquid 114 is 3M™ Company's Novec™ 649 which has a transition temperature of 49° C. and a heat of vaporization of 88 kJ/kg. The Novec™ 649 has a representative inlet temperature of $T6=19°$ C. when it enters jacket 44 as a liquid. As it passes through jacket 44 in its liquid state, the Novec™ 649 absorbs heat Q1 to cool stator core 23. The Novec™ 649 increases in temperature 30° C. and vaporizes at its vapor transition temperature of $T7=49°$ C., thus maintaining the operating temperature of stator core 23 at or near 49° C.

In cooling circuit 104, a suitable engineered liquid 114 is 3M™ Company's Novec™ 7200 which has a transition temperature of 76° C. and a heat of vaporization of 119 kJ/kg. The Novec™ 7200 has a representative inlet temperature of $T8=61°$ C. when it enters stator winding 22 as a liquid. As it passes through stator winding 22 in its liquid state, the Novec™ 7200 absorbs heat Q2 to cool stator winding 22. The Novec™ 7200 increases in temperature 15° C. and vaporizes at its vapor transition temperature of $T9=76°$ C., thus maintaining the operating temperature of stator winding 22 at or near 76° C.

In cooling circuit 106, a suitable engineered liquid 114 is 3M™ Company's Novec™ 7500 which has a transition temperature of 128° C. and a heat of vaporization of 89 kJ/kg. The Novec™ 7500 has a representative inlet temperature of $T10=103°$ C. when it enters rotor winding 16 as a liquid. As it passes through rotor winding 16 in its liquid state, the Novec™ 7500 absorbs heat Q3 to cool rotor winding 16. The Novec™ 7500 increases in temperature 25° C. and vaporizes at its vapor transition temperature of $T11=128°$ C., thus maintaining the operating temperature of rotor winding 16 at or near 128° C.

In cooling circuit 108, a suitable engineered liquid 114 is 3M™ Company's Novec™ 7300 which has a transition temperature of 98° C. and a heat of vaporization of 102 kJ/kg. The Novec™ 7300 has a representative inlet temperature of $T12=63°$ C. when it enters exciter armature stator winding 38 as a liquid. As it passes through exciter field stator winding 38 in its liquid state, the Novec™ 7300 absorbs heat Q4 to the winding. The Novec™ 7300 increases in temperature and vaporizes at its vapor transition temperature of $T13=98°$ C., thus maintaining the operating temperature of exciter field stator winding 38 at or near 98° C.

Figure 2:
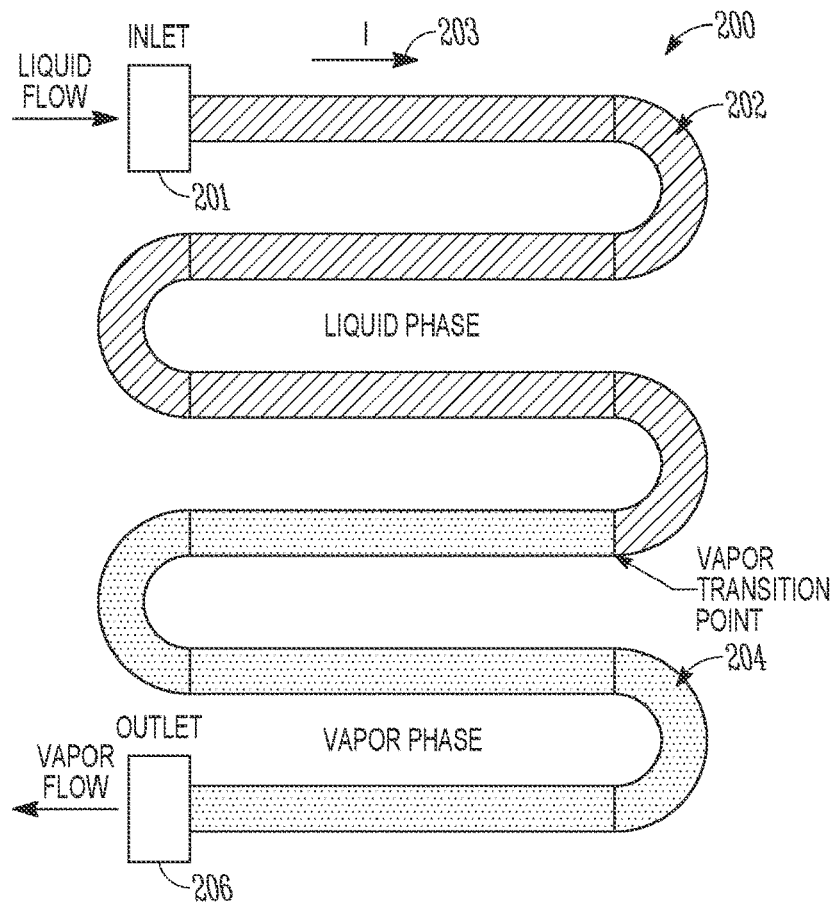
FIG. 2 is a diagram of a portion of a closed-loop fluid path in which an engineered liquid flows in its liquid phase absorbing heat and transitions to its vapor phase.

FIG. 2 shows an electrical hollow conductor 200 with an inlet manifold 201 and outlet manifold 206 whereby electrical current 203 is injected or excited and an engineered liquid 202 is also transferred. Engineered liquid enters an inlet 201 and flows through the hollow conductor which is also an electrical metallic conductor such as forming a stator or rotor winding of an electrical machine. At a distance along the conductor the accumulated heat exceeds the heat of vaporization (e.g., 119 kJ/kg if a 3M™ Company Novec™ 7200 is used) and the engineered liquid 202 transitions to a vapor 204 within the conductor at a vapor transition point and exits as a vapor at outlet 206. It is understood that the exact location of the vapor transition point will vary according to the actual electrical load and consequent electrical dissipative losses in the conductor. It is desirable from a design standpoint for the vapor transition point at maximum electrical dissipation to be within the last half of the hollow conductor's path. The singular conductor can be repeated multiple times with a primary or secondary winding structure to allow for multiple winding turns as is common practice whereby coils are both in electrical series connection and in electrical parallel connection.

Figure 3:
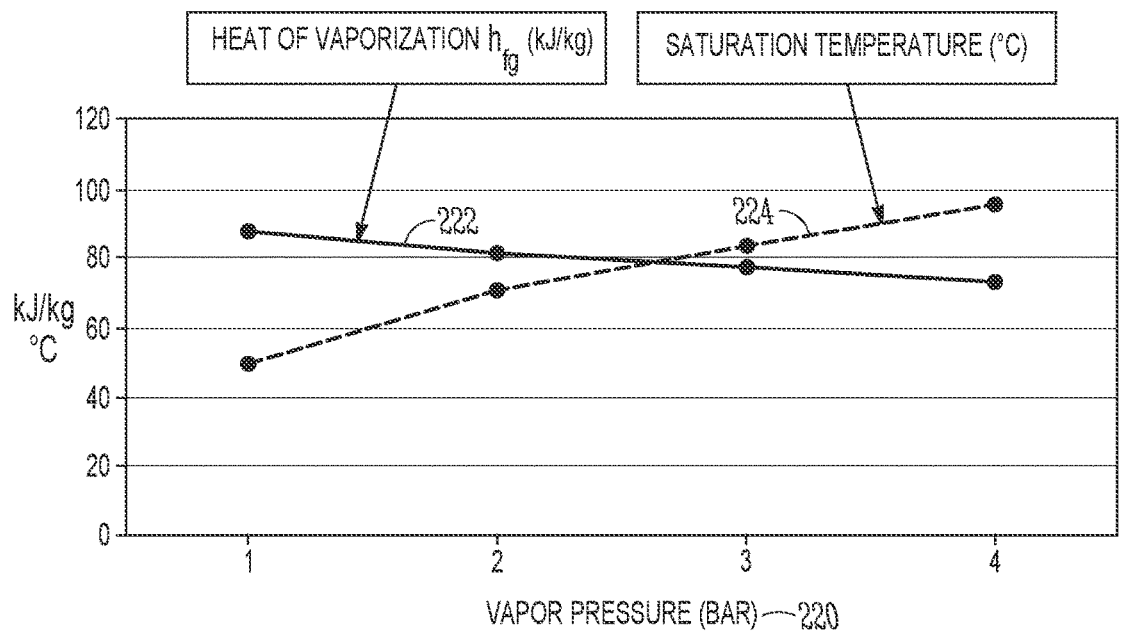
FIG. 3 is a plot of Saturation Temperature and Specific Energy vs. Vapor Pressure for a fluorinated ketone at saturation conditions.

There is also generated a vapor pressure 220 within the hollow conductor which is temperature dependent as shown in FIG. 3 indicating a vapor pressure range of 1-4 bars at a saturation temperature 224 of 49° C. to 96° C. respectively for a specific fluid Novec™ No. 649. FIG. 3 also indicates that heat of vaporization 222 falls to a minor extent as function of higher vapor pressures which is acceptable.

Figure 4A:
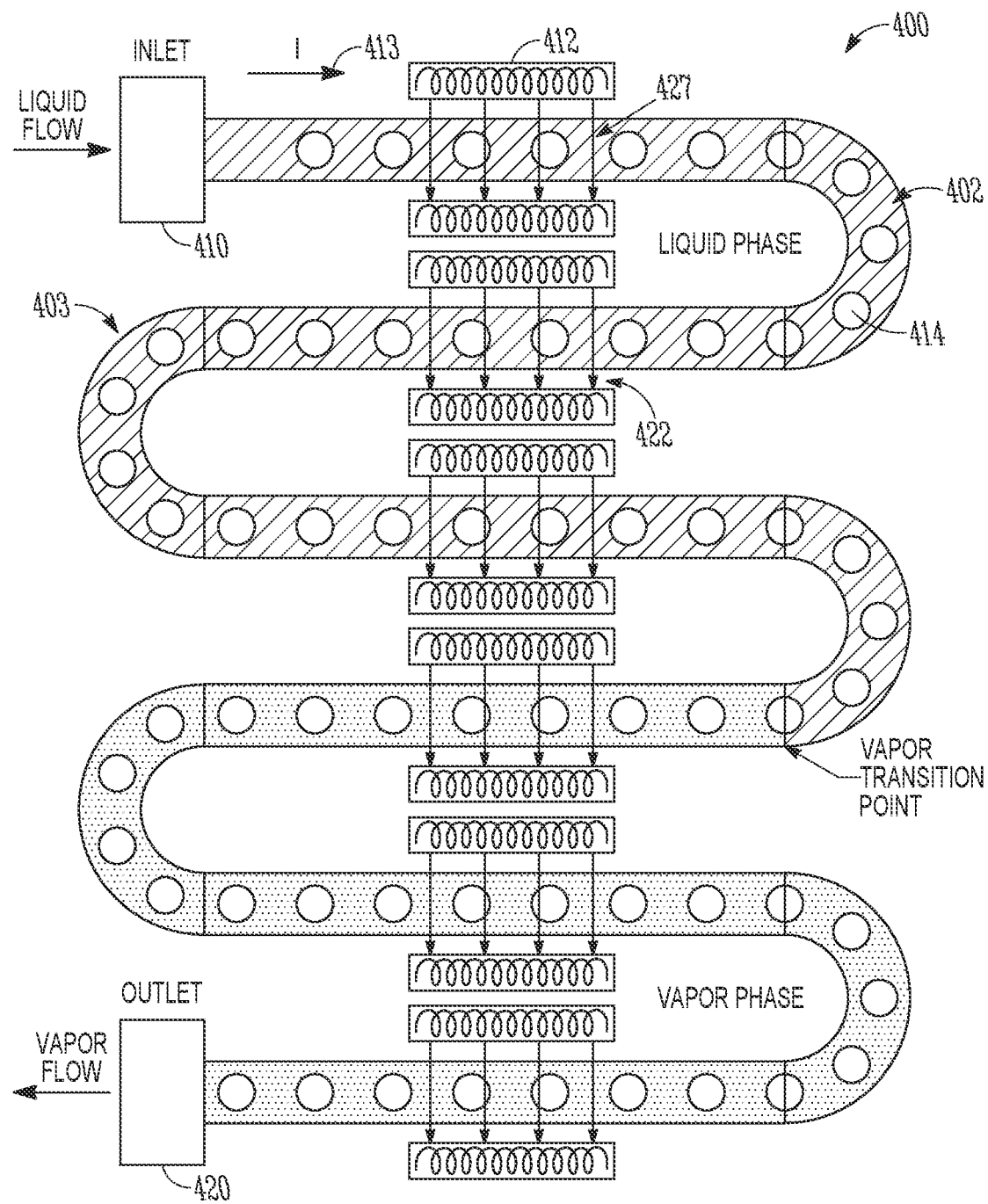
FIGS. 4A and 4B are diagrams of a portion of a closed-loop fluid path in which an engineered liquid including a conductive solid granular media flows in response to the interaction of traveling wave generated by distributed electro-magnetic pumps with the media in its liquid phase absorbing heat and transitions to its vapor phase.
Figure 4B:
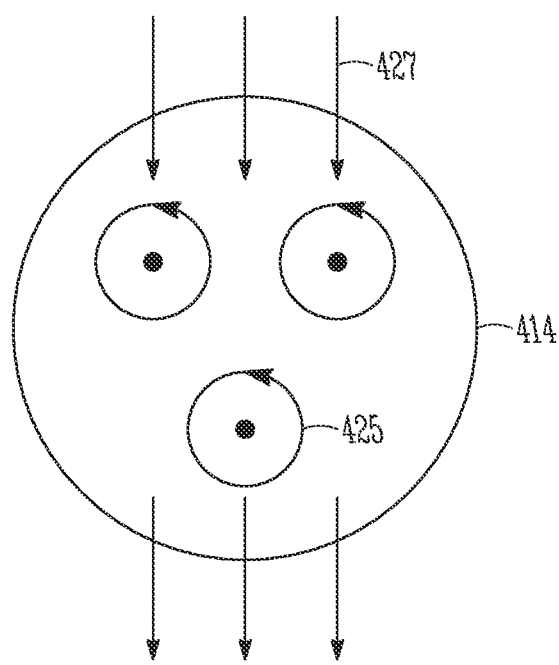

Referring now to FIG. 4A-4B, an embodiment of system of a two-phase liquid-cooled system 400 includes an engineered liquid 402 that is seeded with a conductive solid granular media 414 and introduced to a hollow electrical conductor 403 at an inlet 410, vaporized within the hollow electrical conductor, exhausted at outlet 420, condensed and recirculated. Electrical current 413 may be injected or excited to flow through hollow electrical conductor. Media 414 increases the overall cooling capacity, improves the uniformity of cooling over the hollow electrical conductor 403 and may be used to propel the engineered liquid 402 around the fluid path. Media 414 is suitably both electrically and thermally conductive, a suitable material being aluminum or magnesium alloy, which are both lightweight and high thermal conductivity materials with ability to be formed preferably into small spherical balls or "shot". The media 414 is designed to accept heat content from the electrical hollow conductor but not to melt. The engineered liquid flow is seeded with the media 414 prior to entering the system 400 and this media continues throughout the system and exits at outlet 420. Media 414 accepts (and removes) heat in the first half of the hollow electrical conductor prior to vaporization thereby improving the distribution of heat acceptance and more uniformly cooling the conductor. The conductive media is small enough in size, for example 0.065 inch diameter, to pass through a liquid pump, vapor pressure sensor, liquid pressure sensor and condenser as described in FIGS. 1D-1E, and be constantly recirculated. The extra heat content of the conductive media 414 can be efficiently transferred to the external chilled liquid reservoir in FIG. 1 through the condensers.

An electromagnetic pump 412 may be used to propel the media 414, and engineered liquid 402, through the hollow electrical conductor 403. The electromagnetic pump 412, such as a coaxial electromagnetic pump, induces a traveling magnetic wave through an airgap 422 between the walls of the hollow electrical conductor to create eddy currents 425 in media 414. The media 414 is propelled by the cross product of the induced eddy currents 425 from the electromagnetic pump's AC magnetic B-field 427 and the B-field strength as shown in FIG. 4B. In a preferred embodiment, the B-field within the hollow conductor can be a strength of 1.5 to 1.7 Tesla. The conductive media 414 absorbs heat from the electrical conductor which is first transferred to the fluid 402 at first portions of the coolant path. It is not essential that the electromagnetic pump be continuous and as shown in FIG. 4A the pump is segmented to allow for bends or curvature in the electrical hollow conductor along a practical winding.

If the electromagnetic pump 412 is of sufficient capacity and a sufficient quantity of conductive media 414 is employed as a primary transport means, then conventional type of mechanical liquid pumps 106 or 120 shown in FIG. 1 may be replaced exclusively by the electromagnetic pump 412. The vapor transition point within the hollow conductor preferably occurs within the last half of the overall flow path.

In order to best tailor a cooling system for a particular configuration of a AC rotating electrical machine, multiple machine components (e.g., stator core, stator winding(s), rotor winding, exciter field stator winding) may be connected in series and/or in parallel within a given cooling circuit depending on the operating temperature and heat load requirements of the individual components. Generally speaking, machine components with lower heat loads may be accommodated by a temperature increase of the engineered liquid in either its liquid or vapor states, not requiring the heat capacity associated with phase transition. Depending on the desired operating temperatures, the components may be positioned in either the lower temperature liquid portion or the higher temperature vapor portion of the fluid path. Vaporization may occur in multiple machine components either in parallel or in series to accommodate higher heat load components. A given cooling circuit can be configured to combine series and parallel connections.

Figure 5:
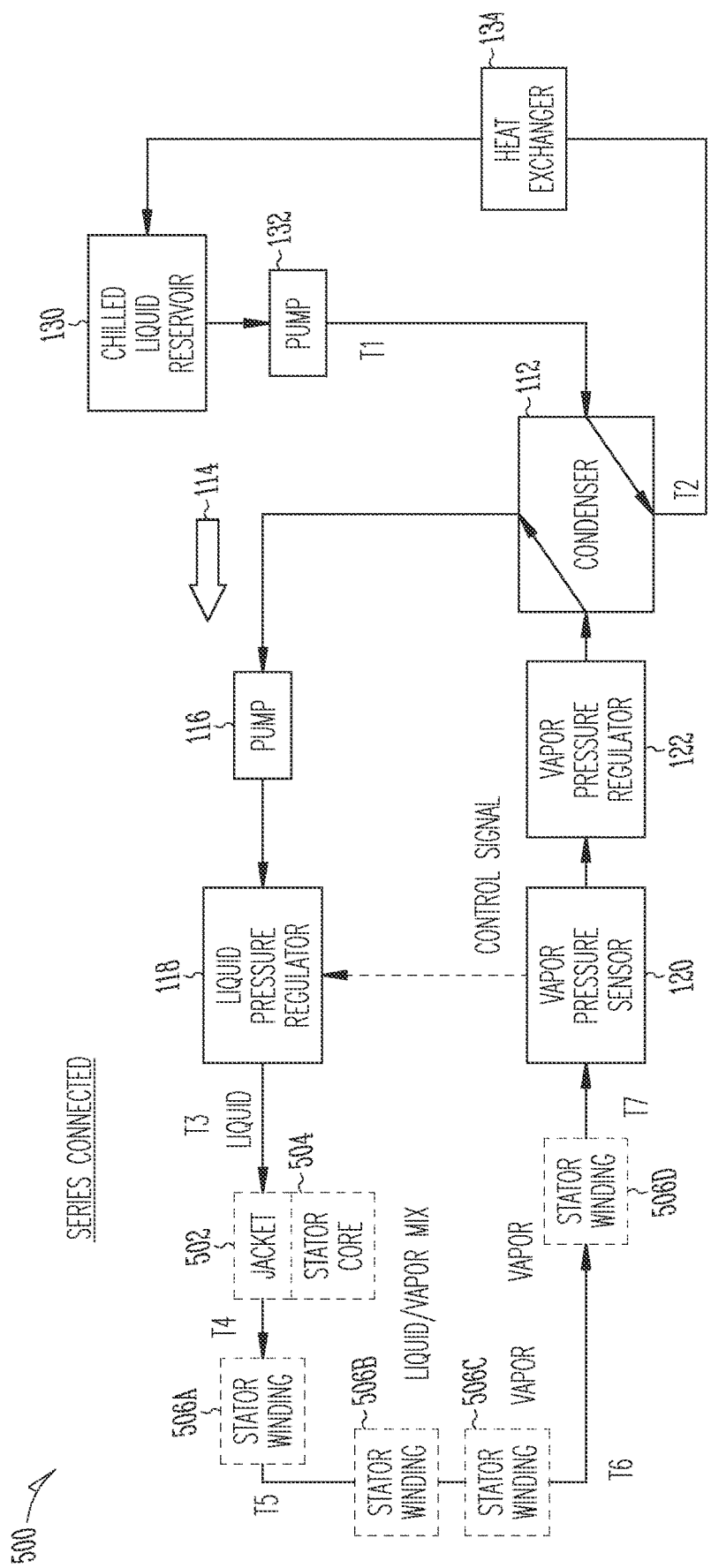
FIG. 5 is a diagram of a closed-loop fluid path in which one or more hollow core stator windings and a stator core are connected in series.
Figure 6:
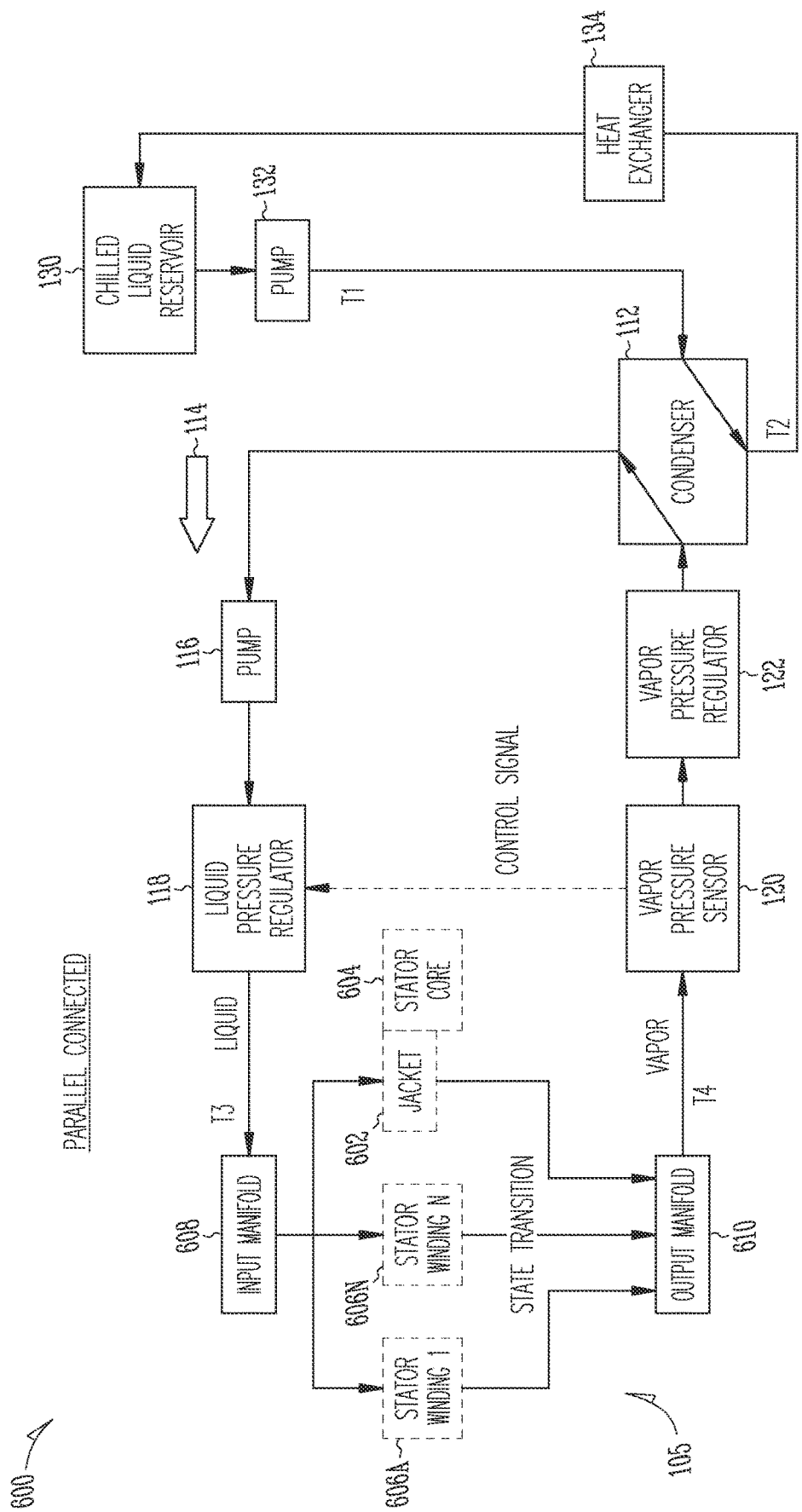
FIG. 6 is a diagram of a closed-loop fluid path in which one or more hollow core stator windings and a stator core are connected in parallel.

As shown in FIG. 5, a cooling circuit 500 recirculates an engineered liquid 114 through a series connection of jacket 502 in direct thermal contact with a stator core 504 and four different stator windings 506A-506D. Each component has a specified operating temperature (or not to exceed operating temperature) and heat load that must be absorbed by the cooling circuit 500 to maintain the operating temperature. In this example, engineered liquid 114 enters jacket 502 as a liquid at temperature T3, absorbs heat Q1 increasing the liquid temperature to T4 where it enters stator winding 506A, absorbs heat Q2 further increasing the liquid temperature to T5. The engineered liquid passes through stator winding 506A, which absorbs heat Q3 partially vaporizing the liquid. Stator winding 506C absorbs heat Q4 completing the vaporization of the engineered liquid at the phase transition temperature T6. The vapor then passes through stator winding 506D absorbing heat Q5 and increasing the vapor temperature to T7. Condenser 112 removes the cumulative absorbed heat returning the vapor to its liquid state at a lower temperature. Series connection is particularly useful to address the cooling requirements of machine components with different heat loads and specified operating temperatures As shown in FIG. 6, a cooling circuit 600 recirculates an engineered liquid 114 through a parallel connection of jacket 602 in direct thermal contact with a stator core 604 and N different stator windings 606A-606N. Each component has a specified operating temperature (or not to exceed operating temperature) and heat load that must be absorbed by the cooling circuit 600 to maintain the operating temperature. Parallel connection is particularly useful to address the cooling requirements of machine components with similar heat loads and maximum operating temperatures. In this example, engineered liquid 114 enters an input manifold 608 that separates the liquid at temperature T3 into N different flows, typically but not necessarily of equal volume, that are coupled into the N stator windings 606A-606N and jacket 602. Within each machine component, sufficient heat is absorbed to at least partially vaporize engineered liquid 114 at the phase transition temperature T4. An output manifold 610 combines the at least partially vaporized flow into a single flow that is provided to vapor pressure sensor 120. Condenser 112 removes the cumulative absorbed heat returning the vapor to its liquid state at a lower temperature.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

I claim:

1. A two-phase liquid-cooled alternating current (AC) rotating electrical machine, comprising:
  a wound field electric machine including a rotor in which a hollow conductor rotor winding is wound around a ferromagnetic material and a stator including one or more hollow conductor stator windings supported by a magnetic stator core, said rotor configured to rotate about a central axis of the stator;
  a first cooling circuit including a first closed-loop fluid path in which a first engineered liquid selected from fluorinated ketones (FKs), hydrofluoroethers (HFEs), perfluorocarbons (PFCs), hydrofluorocarbons (HFCs), perfluorohexans (PFHs), perfluoropolyether (PFPEs) and chlorofluorocarbons (CFCs) is recirculated through the hollow conductor rotor winding, wherein the first engineered liquid is evaporated at a first phase transition temperature within the hollow conductor rotor winding to cool the hollow conductor rotor winding and hold its operating temperature at or near the first phase transition temperature;

a second cooling circuit including a second closed-loop fluid path in which a second engineered liquid selected from FKs, HFEs, PFCs, HFCs, PFHs, PFPEs and CFCs is recirculated through the one or more hollow conductor stator windings, wherein the second engineered liquid is evaporated at a second phase transition temperature within the one or more stator windings to cool the one or more hollow conductor stator windings and hold its operating temperature at or near the second phase transition temperature;

wherein said first and second engineered liquids exhibit different first and second phase transition temperatures and different heats of vaporization;

a third cooling circuit including a third closed-loop fluid path in which a third engineered liquid selected from FKs, HFEs, PFCs, HFCs, PFHs, PFPEs and CFCs is recirculated around the magnetic stator core, wherein the third engineered liquid is evaporated at a third phase transition temperature to cool the magnetic stator core and hold its operating temperature at or near the third phase transition temperature, which differs from the first and second phase transition temperatures and heats of vaporization.

2. The AC rotating electrical machine of claim 1, wherein the first phase transition temperature and the operating temperature of the hollow conductor rotor winding is higher than the second phase transition temperature and the operating temperature of the one or more hollow conductor stator windings.

3. The AC rotating electrical machine of claim 1, wherein the first and second cooling circuits each include a pump to recirculate the engineered liquid, a liquid pressure regulator to regulate a pressure of the engineered liquid, a vapor pressure sensor to sense and feedback the vapor pressure to the liquid pressure regulator to control the flow of liquid, a vapor pressure regulator to regulate the vapor pressure of the engineered liquid in its vapor state, and a condenser coupled to a common chilled liquid reservoir to condense the engineered vapor into the engineered liquid for recirculation.

4. The AC rotating electrical machine of claim 1, wherein the first and second engineered fluids each comprise a conductive solid granular media, wherein the first and second cooling circuits each comprise an electro-magnetic pump that generates a traveling magnetic field inside the closed-loop fluid path that interacts with the conductive solid granular media to produce an electrodynamic force to propel the engineered fluid and conductive solid granular media, wherein the conductive solid granular media increases heat transfer from the hollow conductor winding to vaporization of the engineered liquid to more uniformly cool the hollow conductor winding.

5. The AC rotating electrical machine of claim 1, wherein the wound field electric machine includes a plurality N of hollow conductor stator windings, wherein the second cooling circuit further includes a 1:N inlet manifold that distributes the second engineered liquid to flow through and vaporize within the N hollow conductor stator windings in parallel to hold each stator winding at or near the second phase transition temperature and an N:1 outlet manifold that collects the vapor from the hollow conductor stator windings for condensation back to a liquid state for recirculation.

6. The AC rotating electrical machine of claim 1, wherein the wound field electric machine includes a plurality N of hollow conductor stator windings that exhibit different heat loads, wherein the N hollow conductor stator windings are connected in series in the second closed-loop fluid path such that the second engineered liquid vaporizes in at least the one stator winding exhibiting the highest heat load, wherein the remaining stator windings are cooled by one of a vaporization of a remaining portion of the second engineered liquid or an increase in temperature of the second engineered liquid in either its liquid or vaporized state.

7. A two-phase liquid-cooled alternating current (AC) rotating electrical machine, comprising:

a wound field electric machine including a rotor in which a hollow conductor rotor winding is wound around a ferromagnetic material and a stator including one or more hollow conductor stator windings supported by a magnetic stator core, said rotor configured to rotate about a central axis of the stator;

a first cooling circuit including a first closed-loop fluid path in which a first engineered liquid selected from fluorinated ketones (FKs), hydrofluoroethers (HFEs), perfluorocarbons (PFCs), hydrofluorocarbons (HFCs), perfluorohexans (PFHs), perfluoropolyether (PFPEs) and chlorofluorocarbons (CFCs) is recirculated through the hollow conductor rotor winding, wherein the first engineered liquid is evaporated at a first phase transition temperature within the hollow conductor rotor winding to cool the hollow conductor rotor winding and hold its operating temperature at or near the first phase transition temperature;

a second cooling circuit including a second closed-loop fluid path in which a second engineered liquid selected from FKs, HFEs, PFCs, HFCs, PFHs, PFPEs and CFCs is recirculated through the one or more hollow conductor stator windings, wherein the second engineered liquid is evaporated at a second phase transition temperature within the one or more stator windings to cool the one or more hollow conductor stator windings and hold its operating temperature at or near the second phase transition temperature;

wherein said first and second engineered liquids exhibit different first and second phase transition temperatures and different heats of vaporization;

wherein the magnetic stator core is connected in series with the hollow core stator winding in the second closed-loop fluid path such that the second engineered liquid vaporizes in the hollow conductor stator winding, wherein the magnetic stator core is cooled by one of a vaporization of a remaining portion of the second engineered liquid or an increase in temperature of the second engineered liquid in either its liquid or vaporized state.

8. A two-phase liquid-cooled alternating current (AC) rotating electrical machine, comprising:

An electric machine including a rotor that provides a magnetic field and a stator including one or more hollow conductor stator windings supported by a magnetic stator core, said rotor configured to rotate about a central axis of the stator;

a first cooling circuit including a first closed-loop fluid path in which a first engineered liquid selected from fluorinated ketones (FKs), hydrofluoroethers (HFEs), perfluorocarbons (PFCs), hydrofluorocarbons (HFCs), perfluorohexans (PFHs), perfluoropolyether (PFPEs) and chlorofluorocarbons (CFCs) is recirculated around the magnetic stator core, wherein the first engineered liquid is evaporated at a first phase transition temperature to cool the magnetic stator core and hold its operating temperature at or near the first phase transition temperature;

a second cooling circuit including a second closed-loop fluid path in which a second engineered liquid selected from FKs, HFEs, PFCs, HFCs, PFHs, PFPEs and CFCs is recirculated through the one or more hollow conductor stator windings, wherein the second engineered liquid is evaporated at a second phase transition temperature within the one or more stator windings to cool the one or more hollow conductor stator windings and hold its operating temperature at or near the second phase transition temperature;

wherein said first and second engineered liquids exhibit different first and second phase transition temperatures and different heats of vaporization.

9. The AC rotating electrical machine of claim 8, wherein the first phase transition temperature and the operating temperature of the magnetic stator core is lower than the second phase transition temperature and the operating temperature of the one or more hollow conductor stator windings.

10. The AC rotating electrical machine of claim 8, wherein the first engineered fluid is recirculated in either a void space inside a vessel around the magnetic stator core or in hollow tubing wound around the magnetic stator core.

11. The AC rotating electrical machine of claim 8, wherein the wound field electric machine includes a plurality N of hollow conductor stator windings that exhibit similar heat loads, wherein the second cooling circuit further includes a 1:N inlet manifold that distributes the second engineered liquid to flow through and vaporize within the N hollow conductor stator windings in parallel to hold each stator winding at or near the second phase transition temperature and an N:1 outlet manifold that collects the vapor from the hollow conductor stator windings for condensation back to a liquid state for recirculation.

12. The AC rotating electrical machine of claim 8, wherein the wound field electric machine includes a plurality N of hollow conductor stator windings that exhibit different heat loads, wherein the N hollow conductor stator windings are connected in series in the second closed-loop fluid path such that the second engineered liquid vaporizes in at least the one stator winding exhibiting the highest heat load, wherein the remaining stator windings are cooled by one of a vaporization of a remaining portion of the second engineered liquid or an increase in temperature of the second engineered liquid in either its liquid or vaporized state.

13. The AC electrical machine of claim 8, wherein two-phase liquid-cooling system with closed-loop fluid paths allow for the AC rotating electrical machine to be orientation independent.

14. The AC electrical machine of claim 8, wherein the first and second cooling circuits each include a pump to recirculate the engineered liquid, a liquid pressure regulator to regulate a pressure of the engineered liquid, a vapor pressure sensor to sense and feedback the vapor pressure to the liquid pressure regulator to control the flow of liquid, a vapor pressure regulator to regulate the vapor pressure of the engineered liquid in its vapor state, and a condenser coupled to a common chilled liquid reservoir to condense the engineered vapor into the engineered liquid for recirculation.

15. The AC electrical machine of claim 8, wherein the first and second engineered fluids each comprise a conductive solid granular media, wherein the first and second cooling circuits each comprise an electro-magnetic pump that generates a traveling magnetic field inside the closed-loop fluid path that interacts with the conductive solid granular media to produce an electrodynamic force to propel the engineered fluid and conductive solid granular media, wherein the conductive solid granular media increases heat transfer from the hollow conductor winding to vaporization of the engineered liquid to more uniformly cool the hollow conductor winding.

16. A two-phase liquid-cooled alternating current (AC) electrical machine, comprising:

an electric machine including a rotor that provides a magnetic field and a stator including one or more hollow conductor stator windings supported by a magnetic stator core, said rotor configured to rotate about a central axis of the stator; and a cooling circuit including a closed-loop fluid path in which an engineered liquids selected from fluorinated ketones (FKs), hydrofluoroethers (HFEs), perfluorocarbons (PFCs), hydrofluorocarbons (HFCs), perfluorohexans (PFHs), perfluoropolyether (PFPEs) and chlorofluorocarbons (CFCs) is recirculated around the magnetic stator core and through the one or more hollow conductor stator windings, wherein the engineered liquid is evaporated at a phase transition temperature to cool at least one of the hollow conductor stator windings and hold its operating temperatures at or near the phase transition temperature and to cool the remaining hollow conductor stator windings and stator core;

wherein the magnetic stator core is connected in series with the one or more hollow core stator windings in the closed-loop fluid path such that the engineered liquid vaporizes in the at least one hollow conductor stator winding, wherein the magnetic stator core is cooled by one of a vaporization of a remaining portion of the engineered liquid or an increase in temperature of the engineered liquid in either its liquid or vaporized state.

* * * * *